Sept. 7, 1948.  W. K. SCHON  2,448,917
UNIVERSAL COUPLING FOR LINEAR ACTUATORS
Filed Feb. 16, 1945
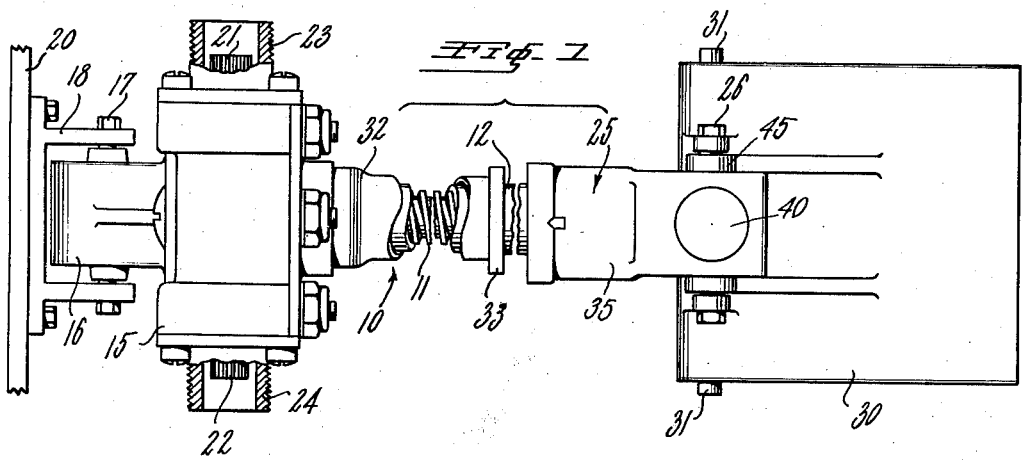
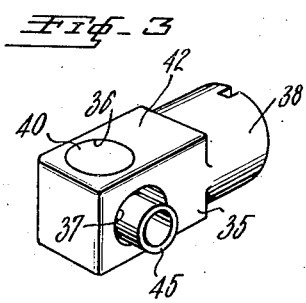
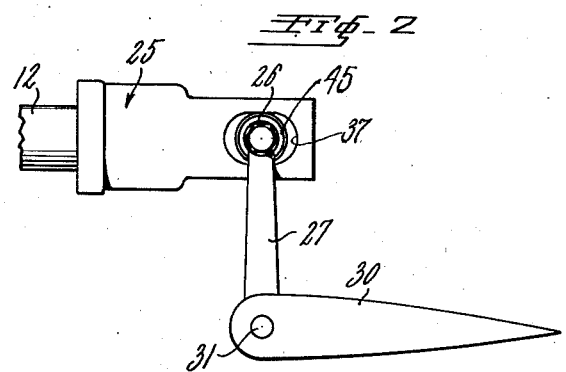
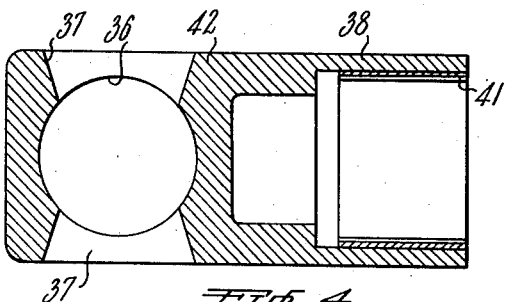
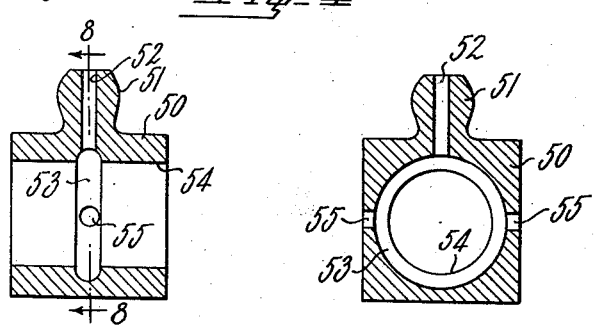
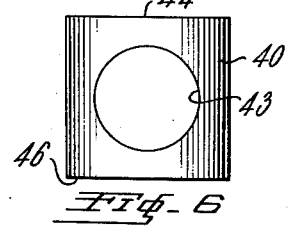
INVENTOR.
WILLIAM K. SCHON
BY Richard A. Narsen
ATTORNEY Patented Sept. 7, 1948

2,448,917

UNITED STATES PATENT OFFICE 2,448,917

UNIVERSAL COUPLING FOR LINEAR ACTUATORS

William K. Schon, Piqua, Ohio, assignor to Lear, Incorporated, Piqua, Ohio, a corporation of Illinois Application February 16, 1945, Serial No. 578,301

14 Claims. (Cl. 287—97)

1

This invention relates to universal jack mountings, and more particularly to a novel universal joint particularly adapted to couple angularly adjustable members.

It is among the objects of this invention to provide a universal coupling capable of permitting relative movement in two planes; to provide a simple end fitting for a jack screw by means of which the jack screw may be universally coupled to a movable member; to provide a universal joint comprising a housing, a pin oscillatably mounted therein, and a bushing extending through the pin for pivotal connection to adjustable elements; to provide a universal joint having a housing formed with a cylindrical bore receiving a cylindrical pin and including a cylindrical bushing extending diametrically of the pin; and to provide a simple, rugged, effective and inexpensive universal joint.

These and other objects, advantages and features of the invention will be apparent from the following description and the accompanying drawing. In the drawing:

Fig. 1 is a plan view of a wing flap operating mechanism incorporating the universal jack mount of the present invention.

Fig. 2 is an elevation view of the right end of Fig. 1.

Fig. 3 is a perspective view of the universal coupling of the invention.

Fig. 4 is a horizontal sectional view through a housing of the coupling.

Fig. 5 is a top plan view of a pin forming part of the coupling.

Fig. 6 is an elevation view of the pin.

Fig. 7 is a diametric sectional view through a modified form of the pin.

Fig. 8 is a view on the line 8—8 of Fig. 7.

Generally speaking, the universal jack coupling of the present invention comprises a housing having a block portion and a socket portion. The socket portion is adapted to be non-rotatably secured to an extensible member of a linear actuator, such as a jack screw. The block portion is formed with a cylindrical bore and a pair of flaring passageways extending radially outwardly through the block from this bore. A cylindrical pin having a cylindrical bore extending diametrically therethrough is mounted in the cylindrical bore of the housing member. A tubular bushing extends through the cylindrical bore of the pin and outwardly through the passageways in the housing member.

The pin member permits oscillatory movement of the tubular bushing in the plane of the openings in the housing. These openings are flared to provide a definite range of angular movement for the tubular member. The tubular bushing may receive a resilient mounting of the type described and claimed in the copending application of William P. Lear, Serial No. 481,980, filed April 6, 1943, for Linear actuator, now abandoned, and assigned to the same assignee as the present invention. The tubular bushing permits pivotal movement of a pair of connected surfaces in a plane at right angles to the plane of oscillation of the bushing.

Referring to the drawing, Figs. 1 and 2 illustrate the invention as applied to a linear actuator for operating a movable accessory such as the wing flap of an aircraft. A linear actuator 10 as shown may be of the type described and claimed in said application, and comprise a screw 11 threadedly engaging a sleeve 12. Screw 11 is rotatable by gearing contained in a gear housing 15 having a mounting member 16. Mounting member 16 is connected by a bolt and nut 17 to a bracket 18 secured to a suitable fixed portion 20 of the aircraft surface. The mounting 16 includes a resilient thrust absorbing member. The gearing in housing 15 is arranged to be driven from a suitable power drive means, such as an electric motor, through the medium of flexible shafting coupled to splines 21 and 22 by coupling members engaging threaded nipples 23 and 24.

Sleeve 12 is fixed against rotation by being secured in the housing member of universal coupling 25 which is pivotally connected by a bolt and nut 26 to one arm of a crank 27 connected to operate wing flap 30. Pintles 31 pivotally support wing flap 30 for angular movement with respect to fixed surface 20 of the aircraft. A suitable dust sleeve 32 may be secured to housing 15 and be at least coextensive in length with screw 11. Dust sleeve 32 is telescopically related with threaded sleeve 12 so that, as actuator 10 is extended, sleeve 32 will protect the threads of screw 11 from the entry of any foreign matter. For this purpose, a gasket (not shown) is provided in a flange 33 of sleeve 32 and engages the exterior surface of sleeve nut 12.

By relative rotation of screw 11, sleeve 12 is moved longitudinally with respect thereto. Thus, wing flap 30 is moved to any adjusted position with respect to fixed surface 20. Due to the angular relation of the parts, mounting member 16 and universal coupling 25 permit actuator 10, fixed surface 20 and wing flap 30 to assume any necessary angular interrelation during movement of the wing flap.

Coupling 25 is more clearly illustrated in Fig. 3. It comprises a housing member 35, a pin 40 and a tubular bushing 45. Pin 40 is engaged in a cylindrical bore 36 of housing 35, and bushing 45 extends diametrically through pin 40 and is oscillatable with respect to housing 35. This oscillation is provided by openings 37 between bore 36 and the exterior of housing 35, which openings are flared to permit oscillatory movement of bushing 45.

Housing 35 is shown more clearly in Fig. 4 as comprising a socket portion 38 containing a bearing member 41 adapted to be engaged with nut 12 of actuator 10. The housing member also includes a block section 42 which is formed with the above mentioned cylindrical recess 36 and with flaring passageways 37 extending radially therefrom to the outer surface of the block.

Pin 40 is shown in Figs. 5 and 6 as being a cylindrical member having a tubular bore 43 extending diametrically thereof between top and bottom surfaces 44 and 46 of the pin.

To assemble the coupling, pin 40 is engaged with cylindrical bore 36 and bushing 45 is press fitted in tubular bore 43 of pin 40. Pin 40 permits oscillatory movement of bushing 45 in the plane of openings 37, such oscillatory movement being limited by the extent of the flare of the openings. Bushing 45 may be coupled, as previously described, to one of the angularly adjustable members, through the medium of a bolt extending through the bushing. A suitable additional bushing or a resilient sleeve may be inserted in bushing 45, if desired.

Figs. 7 and 8 show a modified form of a pin. In these figures, the pin 50 is provided with a fitting 51 for a suitable grease gun of the "Alemite" or "Zerk" type. Fitting 51 has an axial passage 52 communicating with a circular slot 53 extending circumferentially of tubular bore 54. Bore 54 extends diametrically of member 50. Openings 55, 55 extend outwardly from groove or slot 53 to permit overflow of grease introduced through nipple or fitting 51.

The described invention comprises a simple, reliable, rugged and inexpensive universal coupling having few parts while yet permitting movement in two planes of a pair of angularly adjustable members connected to the elements of the coupling. The coupling is easily assembled and disassembled for repair and inspection. Additionally, the elements of the coupling are easily and quickly connected to the adjustable members, such as jack screw 10 and wing flap 30.

While specific embodiments of the invention have been shown and described in detail to illustrate the application of the principles thereof, it will be understood that the invention may be otherwise embodied without departing from such principles.

What is claimed is:

1. A coupling comprising, in combination, a first connection member formed with a bore therein and passages opening externally therefrom; a pin oscillatably mounted in said bore; and a second connection member extending through said pin and passages perpendicularly to said bore.

2. A coupling comprising, in combination, a first connection member formed with a bore therein and flaring passages extending radially therefrom; a pin oscillatably mounted in said bore; and a second connection member secured to said pin and extending outwardly through said passages for oscillation in the plane thereof.

3. A coupling comprising, in combination, a first connection member formed with a cylindrical bore and flaring passages extending radially therefrom; a cylindrical pin oscillatably mounted in said bore; and a second connection member secured to said pin and extending outwardly through said passages for oscillation in the plane thereof.

4. A coupling comprising, in combination, a connection member formed with a cylindrical bore and flaring passages extending radially therefrom; a cylindrical pin oscillatably mounted in said bore; and a bushing secured to said pin and extending outwardly through said passages for oscillation in the plane thereof.

5. A coupling comprising, in combination, a coupling member formed with a connection portion and a bearing portion, said bearing portion having a cylindrical bore therethrough and flaring passages extending radially therefrom; a pin oscillatably mounted in said bore; and a bushing secured to said pin and extending outwardly through said passages for oscillation in the plane thereof.

6. A coupling comprising, in combination, a coupling member formed with a connection portion and a bearing portion, said bearing portion having a cylindrical bore therethrough and flaring passages extending radially therefrom; a cylindrical pin oscillatably mounted in said bore; and a bushing secured to said pin and extending outwardly through said passages for oscillation in the plane thereof.

7. A coupling comprising, in combination, a coupling member formed with a connection socket and a bearing portion, said bearing portion having a cylindrical bore therethrough and flaring passages extending radially therefrom; a cylindrical pin oscillatably mounted in said bore; and a bushing secured to said pin and extending outwardly through said passages for oscillation in the plane thereof.

8. A coupling comprising, in combination, a coupling member formed with a connection portion and a bearing portion, said bearing portion having a cylindrical bore therethrough and flaring passages extending radially therefrom; a cylindrical pin oscillatably mounted in said bore and formed with a cylindrical bore extending transversely thereof and aligned with said passages; and a tubular bushing extending through said last named bore and outwardly through said passages for oscillation in the plane thereof.

9. A coupling comprising, in combination, a coupling member formed with a connection portion and a bearing portion, said bearing portion having a cylindrical bore therethrough and flaring passages extending radially therefrom; a cylindrical pin oscillatably mounted in said bore; formed with a cylindrical bore extending transversely thereof and aligned with said passages; a tubular bushing extending through said last named bore and outwardly through said passages for oscillation in the plane thereof; a lubrication fitting formed on said pin; and lubricant passages communicating with said fitting and the bore in said pin.

10. A coupling for connecting angularly adjustable elements, comprising, in combination, a first connection member formed for connection to one of the elements and with a pin bore and passages opening externally therefrom; a pin oscillatably mounted in said bore; and a second connection member extending through said pin and passages perpendicularly to said bore and adapted to be pivotally connected to the other element.

11. A coupling for connecting angularly adjustable elements, comprising, in combination, a first connection member formed for connection to one of the elements and with a cylindrical bore and flaring passages extending radially therefrom; a cylindrical pin oscillatably mounted in said bore; and a second connection member secured to said pin and extending outwardly through said passages for oscillation in the plane thereof and adapted to be pivotally connected to the other element.

12. A coupling for connecting angularly adjustable elements, comprising, in combination, a first connection member formed with a socket for connection to one of the elements and a bearing portion, said bearing portion having a cylindrical bore therethrough and flaring passages extending radially therefrom; a cylindrical pin oscillatably mounted in said bore; and a bushing secured to said pin and extending outwardly through said passages for oscillation in the plane thereof and adapted to be pivotally connected to the other element.

13. A coupling for connecting angularly adjustable elements, comprising, in combination, a first connection member formed with a socket for connection to one of the elements and a bearing portion, said bearing portion having a cylindrical bore therethrough and flaring passages extending radially therefrom; a cylindrical pin oscillatably mounted in said bore and formed with a cylindrical bore extending transversely thereof and aligned with said passages; and a tubular bushing extending through said last named bore and outwardly through said passages for oscillation in the plane thereof and adapted to be pivotally connected to the other element.

14. A coupling for connecting angularly adjustable elements, comprising, in combination, a first connection member formed with a socket for connection to one of the elements and a bearing portion, said bearing portion having a cylindrical bore therethrough and flaring passages extending radially therefrom; a cylindrical pin oscillatably mounted in said bore and formed with a cylindrical bore extending transversely thereof and aligned with said passages; a tubular bushing extending through said last named bore and outwardly through said passages for oscillation in the plane thereof and adapted to be pivotally connected to the other element; a lubrication fitting formed on said pin; and passages communicating with said fitting and the bore in said pin.

WILLIAM K. SCHON.

REFERENCES CITED

The following references are of record in the file of this patent:

UNITED STATES PATENTS

| Number | Name | Date |
|---|---|---|
| 704,321 | Greenwood | July 8, 1902 |

FOREIGN PATENTS

| Number | Country | Date |
|---|---|---|
| 47,147 | Holland | Nov. 15, 1939 |